(12) United States Patent
Zhang et al.

(10) Patent No.: US 11,781,582 B2
(45) Date of Patent: Oct. 10, 2023

(54) LOCKING DEVICE

(71) Applicant: SHENZHEN GLOSHINE TECHNOLOGY CO., LTD., Guangdong (CN)

(72) Inventors: Xianfeng Zhang, Guangdong (CN); Yongjun Zhang, Guangdong (CN); Guoqiang Li, Guangdong (CN); Zhiqiang Gao, Guangdong (CN)

(73) Assignee: SHENZHEN GLOSHINE TECHNOLOGY CO., LTD., Shenzhen (CN)

( * ) Notice: Subject to any disclaimer, the term of this patent is extended or adjusted under 35 U.S.C. 154(b) by 388 days.

(21) Appl. No.: 17/279,580

(22) PCT Filed: Feb. 22, 2021

(86) PCT No.: PCT/CN2021/077271
§ 371 (c)(1),
(2) Date: Mar. 24, 2021

(87) PCT Pub. No.: WO2022/062309
PCT Pub. Date: Mar. 31, 2022

(65) Prior Publication Data
US 2022/0307535 A1    Sep. 29, 2022

(30) Foreign Application Priority Data
Sep. 23, 2020   (CN) .......................... 202011008987.3

(51) Int. Cl.
*F16B 21/04* (2006.01)
*F16C 11/04* (2006.01)
*F16C 11/10* (2006.01)

(52) U.S. Cl.
CPC ............ *F16B 21/04* (2013.01); *F16C 11/045* (2013.01); *F16C 11/10* (2013.01)

(58) Field of Classification Search
CPC .......... F16B 21/02; F16B 21/04; F16C 11/10; F16C 11/103
See application file for complete search history.

(56) References Cited

U.S. PATENT DOCUMENTS 10,482,809 B2 * 11/2019 Xu ........................ G09F 9/3026
10,711,490 B2 * 7/2020 Zhang ................... F16B 5/0092
(Continued)

FOREIGN PATENT DOCUMENTS

CN         104747587 A       7/2015
CN         105575272 A   *   5/2016
(Continued)

OTHER PUBLICATIONS

Supplementary European Search Report of counterpart European Patent Application No. 21714293.4 dated Apr. 20, 2022.

*Primary Examiner* — Jonathan P Masinick

(57) ABSTRACT

Provided is a locking device, comprising a first lock body and a second lock body; the first lock body comprises an angle rotating disc base (11), an angle rotating disc (12) and a lock plate (13), the angle rotating disc (12) can rotate around its own axis and the angle rotating disc base (11) has a first mounting surface; the second lock body comprises a fixed base (21) and a spring lock (22), the fixed base (21) is provided with a second mounting surface, and a limit surface facing one end face of the angle rotating disc (12); one end face of the angle rotating disc (12) facing the limit surface is provided with a plurality of bevels (121) at intervals along circumferential direction; rotating the angle rotating disc (12) can make the limit surface fit with different bevels (121) to adjust the included angle.

14 Claims, 6 Drawing Sheets

(56) References Cited

U.S. PATENT DOCUMENTS

| | | | | |
|---|---|---|---|---|
| 11,145,635 B2* | 10/2021 | Zhang | ..................... | H01L 23/32 |
| 11,269,384 B2* | 3/2022 | Zhang | ....................... | G09F 9/33 |
| 11,310,927 B2* | 4/2022 | Zhang | ................. | H05K 5/0017 |
| 11,549,670 B2* | 1/2023 | Zhang | .................... | F16B 2/185 |
| 2018/0328082 A1* | 11/2018 | Zhang | ................ | H04M 1/0222 |

FOREIGN PATENT DOCUMENTS

| | | | | | |
|---|---|---|---|---|---|
| CN | 105575273 A | * | 5/2016 | ........... | G09F 9/3026 |
| CN | 206672559 U | | 11/2017 | | |
| CN | 108150494 A | * | 6/2018 | ............... | F16B 5/00 |
| CN | 109469674 A | * | 3/2019 | ............. | F16B 2/185 |
| CN | 210423413 U | | 4/2020 | | |
| CN | 212318523 U | | 1/2021 | | |
| JP | 2001065543 A | | 3/2001 | | |

\* cited by examiner

LOCKING DEVICE

The present application claims the priority of the Chinese patent application (No. 202011008987.3) filed with China Patent Office on Sep. 23, 2020, titled "locking device", the contents of which are incorporated herein by reference in their entirety.

TECHNICAL FILED

The disclosure relates to the technical field of LED display screens, in particular to a locking device.

BACKGROUND

LED display screen is used to display information such as text, image, video and video signal. LED display screen has been widely used in many fields because of its advantages of high brightness, low working voltage, low power consumption, large scale, long life, shock resistance and stable performance.

At present, a large LED display screen is formed by splicing a plurality of small LED screens through a locking device. In order to be more suitable for different applications, LED screens are usually spliced into arc LED screens to improve the display effect. Most of the existing arc LED screens are spliced by changing the connection angle of adjacent LED screens through locking devices. However, the applicant found that the existing locking device has many components, complex structure and processing, and is high in cost and complicated to install. Also, it is in arc shape and large in size, it requires large installation space, which leads to the installation position of the locking device being far away from the display surface of the LED screen, which increases the overall thickness of the LED screen. Meanwhile, it is difficult to reduce the whole size of the locking device because the components have to reach the basic strength.

Technical Problem

The present application provides a locking device to solve the problem of complex structure of the existing locking device.

Technical Solutions

To solve the above technical problem, the application adopts the following technical solution: provided is a locking device, including a first lock body and a second lock body;
   the first lock body includes an angle rotating disc base, an angle rotating disc and a lock plate, wherein the angle rotating disc is connected with the angle rotating disc base, the angle rotating disc can rotate around its own axis, the lock plate is arranged between the angle rotating disc base and the angle rotating disc; the angle rotating disc base is provided with a first mounting surface for mounting an LED display screen;
   the second lock body includes a fixed base and a spring lock, wherein the spring lock is arranged on the fixed base, the fixed base is provided with a limit surface facing one end face of the angle rotating disc and a second mounting surface for mounting another LED display screen;
   one end face of the angle rotating disc facing the limit surface is provided with a plurality of bevels at intervals along circumferential direction, and included angles of the plurality of bevels and the first mounting surface are different; and
   rotating the angle rotating disc can make the limit surface fit with different bevels to adjust included angle between the first mounting surface and the second mounting surface, and the spring lock and lock plate can be mutually locked to fix the first lock body and the second lock body temporarily.

In the locking device of the present application, the fixed base is L-shaped, and the limit surface is perpendicular to the second mounting surface.

In the locking device of the present application, the plurality of bevels are uniformly arranged along circumferential direction of one end face of the angle rotating disc.

In the locking device of the present application, the included angle between each bevel and the first mounting surface gradually increases along circumferential direction of one end face of the angle rotating disc.

In the locking device of the present application, the number of the bevels is even, and every two bevels symmetrically arranged at 180° are coplanar.

In the locking device of the present application, the bevel is provided with an angle label.

In the locking device of the present application, a positioning hole is arranged on each bevel, and a positioning post protruding toward the angle rotating disc is arranged on the limit surface, and the positioning post is used for inserting into the positioning hole to limit the rotation of the angle rotating disc.

In the locking device of the present application, the angle rotating disc is movably arranged on the angle rotating disc base, and rotating the angle rotating disc can drive the angle rotating disc to move along axial direction of the angle rotating disc relative to the angle rotating disc base.

In the locking device of the present application, the angle rotating disc base is provided with a thread groove, one end of the angle rotating disc connected with the angle rotating disc base is provided with an external thread, and the thread groove is matched with the external thread to threadedly connect the angle rotating disc base and the angle rotating disc.

In the locking device of the present application, the lock plate is axially and fixedly connected with the angle rotating disc, so that the lock plate moves along axial direction of the angle rotating disc with the angle rotating disc.

In the locking device of the present application, the lock plate includes a lock core and a lock hole arranged on the lock core, the angle rotating disc is provided with an axially penetrating stepped hole, and the lock core is positioned in the stepped hole; the first lock body further includes a limit screw, and the limit screw is fixed on the angle rotating disc, one end of the limit screw extends into the stepped hole, and the limit screw is used for cooperating with steps of the stepped hole to limit the lock core to move axially relative to the angle rotating disc.

In the locking device of the present application, the lock plate is radially and fixedly connected with the angle rotating disc base to restrict the lock plate from rotating with the angle rotating disc.

In the locking device of the present application, the lock plate further includes a slide rail fixed on the lock core, and a sliding groove is arranged in the thread groove of the angle rotating disc base, the slide rail is movably arranged in the sliding groove, and the sliding groove is used for restricting the lock plate from rotating with the angle rotating disc.

In the locking device of the present application, the angle rotating disc is provided with a plurality of marble grooves, one marble groove corresponds to one bevel, a marble is fixed on the angle rotating disc base, and the marble is clamped in the marble groove.

In the locking device of the present application, the angle rotating disc is provided with a rotating disc handle.

Beneficial Effects

Compared with the prior art, the beneficial effects of the locking device of the present application lie in that: the connecting angle between the display surfaces of two LED display screens is locating by attaching the bevel to the limit surface, and then, two LED display screens are fixed by mutually locking the spring lock and lock plate, thereby improving the locating accuracy of LED display screen splicing; meanwhile, the limit surface can fit with different bevels by rotating the angle rotating disc, thereby changing the connection angle between the display surfaces of the two LED display screens, realizing the splicing of LED display screens with different arcs, reducing the splicing difficulty and improving the splicing efficiency. The locking device is simple in structure, its machining accuracy of each structure is easy to control, and it is convenient to install.

Figure 1:
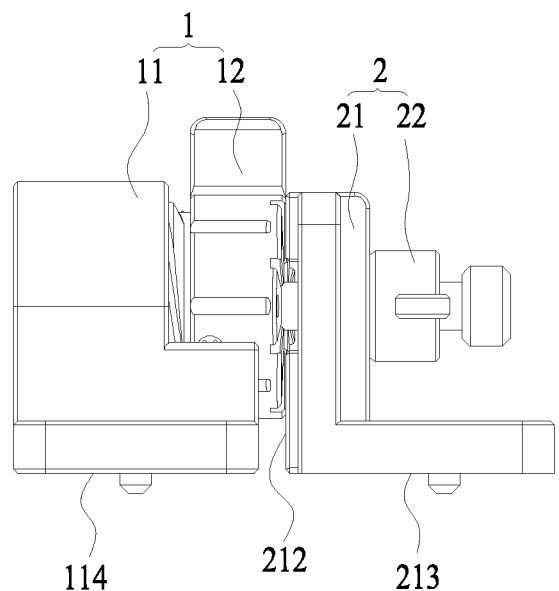
FIG. 1 is a structural schematic diagram I of the locking device provided by an embodiment of the present application.

The reference numerals in the figures are as follows:
1. First lock body; 11. Angle rotating disc base; 111. Thread groove; 112. Sliding groove; 113. Mounting hole; 114. First mounting surface;
12. Angle rotating disc; 121. Bevel; 122. Positioning hole; 123. Marble groove; 124. Rotating disc handle; 125. External thread; 126. Angle label; 127. Stepped hole;
13. Lock plate; 131. Lock core; 132. Slide rail; 133. Lock hole; 1331. Through hole; 1332. Bypass groove;
14. Limit screw;
15. Marble;
2. Second lock body; 21. Fixed base; 211. Positioning post; 212. Limit surface; 213. Second mounting surface; 22. Spring lock; 221. Lock rod; 222. Pull rod; 223. Baffle; 224. Lock rod handle.

DETAILED DESCRIPTION

In order to make the technical problems solved by this application, technical solutions and beneficial effects clearer, the application will be further described in detail with reference to the drawings and embodiments. It should be understood that the specific embodiments described herein are only used to illustrate the application, and not intended to limit the application.

Figure 2:
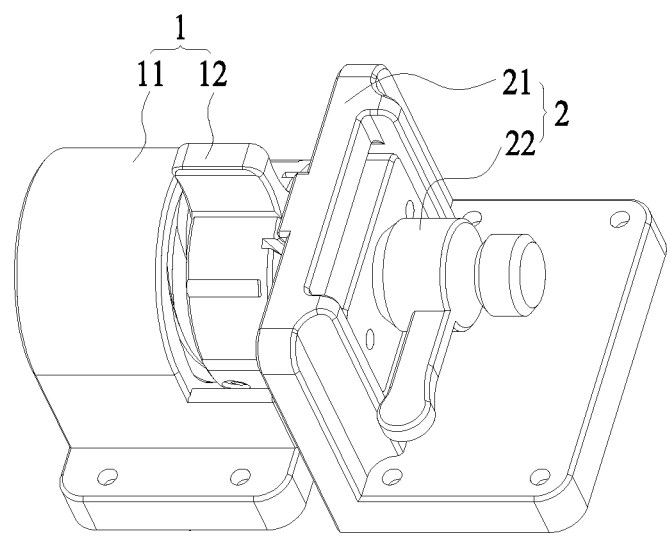
FIG. 2 is a structural schematic diagram II of the locking device provided by an embodiment of the present application.
Figure 3:
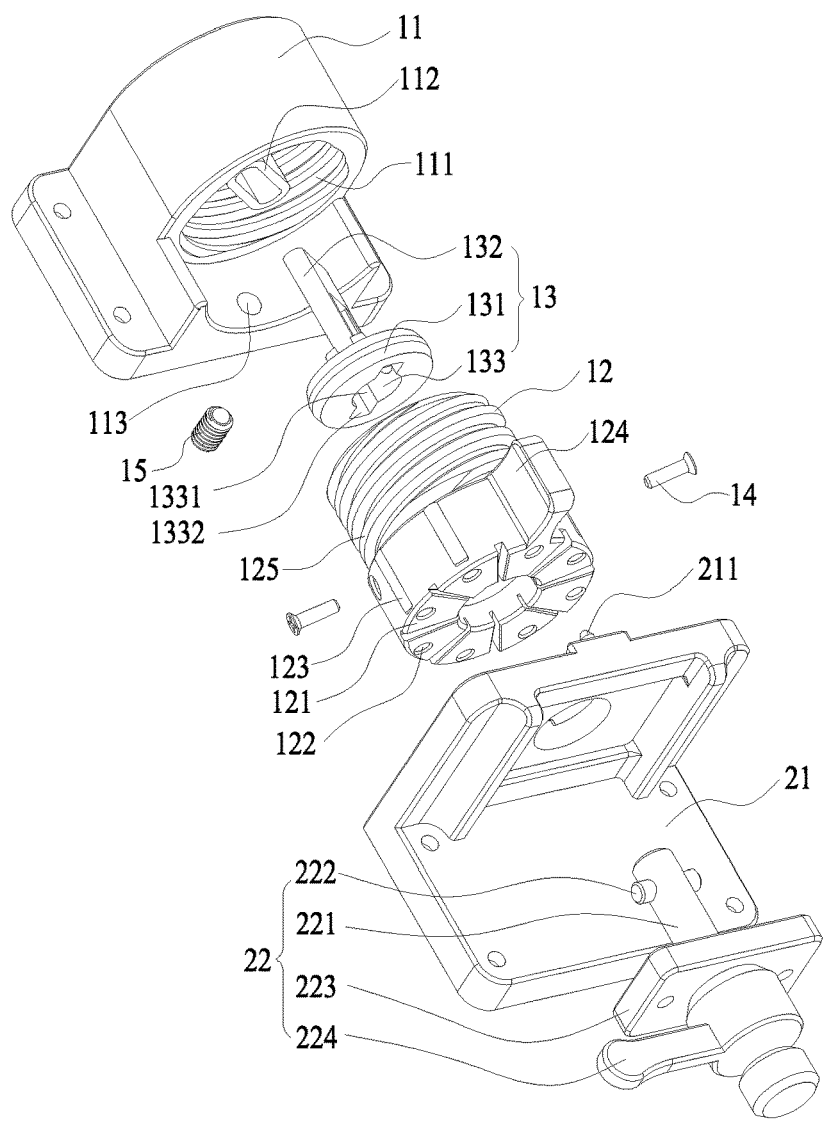
FIG. 3 is an exploded diagram of the structure of FIG. 2.

As shown in FIG. 1 to FIG. 3, the locking device provided by the embodiment of this application includes a first lock body 1 and a second lock body 2.

The first lock body 1 includes an angle rotating disc base 11, an angle rotating disc 12 and a lock plate 13, wherein the angle rotating disc 12 is connected with the angle rotating disc base 11, the angle rotating disc 12 can rotate around its own axis, the lock plate 13 is arranged between the angle rotating disc base 11 and the angle rotating disc 12; the angle rotating disc base 11 is provided with a first mounting surface 114 for mounting an LED display screen.

The second lock body 2 includes a fixed base 21 and a spring lock 22, wherein the spring lock 22 is arranged on the fixed base 21, the fixed base 21 is provided with a limit surface 212 facing one end face of the angle rotating disc 12 and a second mounting surface 213 for mounting another LED display screen.

One end face of the angle rotating disc 12 facing the limit surface 212 is provided with a plurality of bevels 1121 at intervals along circumferential direction, and included angles of the plurality of bevels 1121 and the first mounting surface 114 are different.

Rotating the angle rotating disc 12 can make the limit surface 212 fit with different bevels to adjust included angle between the first mounting surface 114 and the second mounting surface 213, and the spring lock 22 and lock plate 13 can be mutually locked to fix the first lock body 1 and the second lock body 2 temporarily.

The first lock body 1 is fixedly connected with one LED display screen through the first mounting surface 114, and the second lock body 2 is fixedly connected with another LED display screen through the second mounting surface 213. Rotate the angle rotating disc 12 to make the bevel 121 fit with the limit surface 212 to locate the connection angle between the first mounting surface 114 and the second mounting surface 213, thereby locating the connection angle between the display surfaces of the two LED display screens. Then, the spring lock 22 and lock plate 13 are locked with each other to fix the first lock body 1 and second lock body 2, so as to realize arc splicing of the two LED display screens. Unlock the spring lock 22 and lock plate 13, rotate the angle rotating disc 12 to make another bevel 121 fit with the limit surface 212, relocate the connection angle between the first mounting surface 114 and second mounting surface 213, then, the spring lock 22 and lock plate 13 are locked with each other to fix the first lock body 1 and second lock body 2, so as to realize another arc splicing of two LED display screens.

Compared with the prior art, the locking device provided by the embodiments of the present application operates as follows: firstly, the connection angle between the display surfaces of two LED display screens is located by attaching the bevel 1121 to the limit surface 212, and then, two LED display screens are fixed by mutually locking the spring lock 22 and lock plate 13, thereby improving the locating accuracy of LED display screen splicing; meanwhile, the limit surface 212 can fit with different bevels 1121 by rotating the angle rotating disc 12, thereby changing the connection angle between the display surfaces of the two LED display screens, realizing the splicing of LED display screens with different arcs, reducing the splicing difficulty and improving the splicing efficiency. The locking device is simple in structure, its machining accuracy of each structure is easy to control, and it is convenient to install.

In an embodiment, as shown in FIG. 1, the fixed base 21 is L-shaped, and the limit surface 212 is perpendicular to the second mounting surface 213. Compared with the existing arc lock, the locking device has a more compact structure overall, the whole locking device is closer to the display surface of the LED display screen, the volume of the locking device is smaller, the locking device can be installed in a smaller space, and the increase of the thickness of the LED display screen is reduced.

In an embodiment, the axis of the angle rotating disc 12 is parallel to the display surface of the LED display screen.

Figure 4:
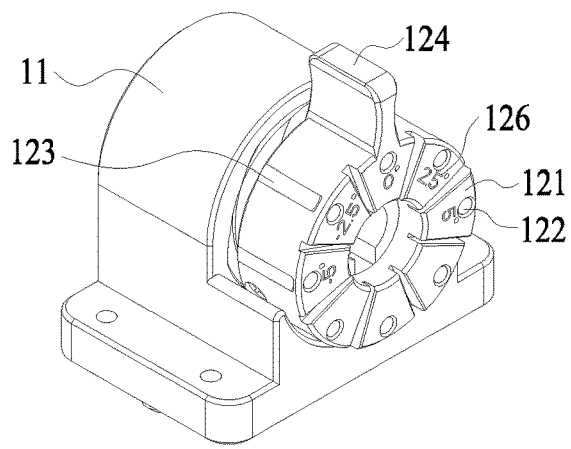
FIG. 4 is a structural schematic diagram of the first lock body provided by an embodiment of the present application.

In an embodiment, as shown in FIGS. 3 and 4, the plurality of bevels 121 are uniformly arranged along the circumferential direction of one end face of the angle rotating disc 12. The angle rotating disc 12 is convenient to rotate, so that the bevels 121 and the limit surface 212 are more closely attached, and the locating accuracy of LED display screen splicing is improved.

In an embodiment, the included angle between each bevel 121 and the first mounting surface 114 gradually increases along the circumferential direction of one end face of the angle rotating disc 12.

In an embodiment, as shown in FIGS. 3 and 4, the number of bevels 121 is even, and every two bevels 121 symmetrically arranged at 180° are coplanar. The connection angle between the first mounting surface 114 and the second mounting surface 213 can be located more accurately by attaching two bevels 121 and the limit surface 212, which further improves the locating accuracy and the splicing efficiency of LED display screens.

In an embodiment, as shown in FIGS. 3 and 4, the number of bevels 121 is eight, and the eight bevels 121 are divided into four bevel groups, wherein the angle between one bevel group and the first mounting surface 114 is equal to the included angle between the limit surface 212 and the second mounting surface 213.

The angle between the bevel 121 and the first mounting surface 114 is A.

Figure 7:
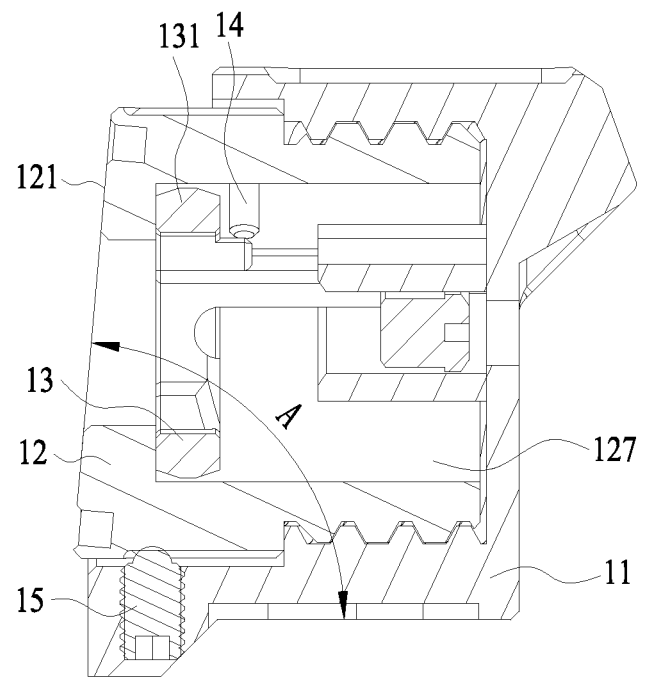
FIG. 7 is an adjustment state diagram I of the bevel of the first lock body provided by an embodiment of the present application.

If A in FIG. 7 is 85°, the included angle between the first mounting surface 114 and the second mounting surface 213 is −5°, that is, the included angle between the display surfaces of two LED display screens is −5°.

Figure 8:
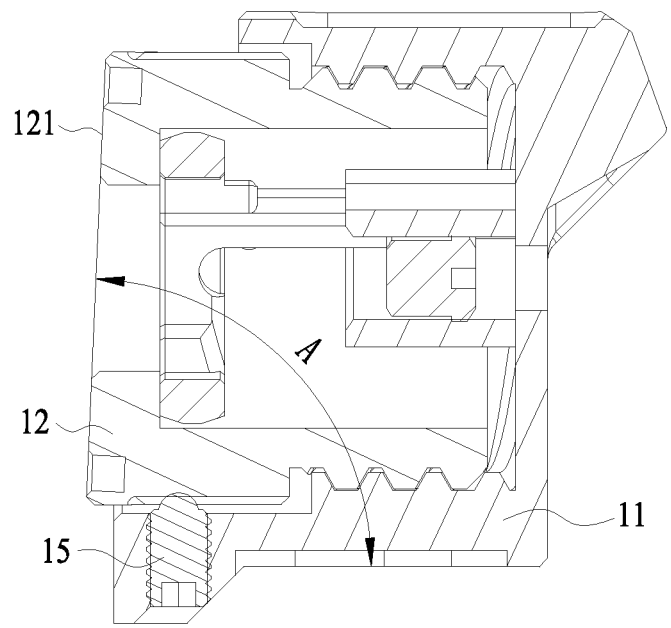
FIG. 8 is an adjustment state diagram II of the bevel of the first lock body provided by an embodiment of the present application.

If A in FIG. 8 is 87.5°, the included angle between the first mounting surface 114 and the second mounting surface 213 is −2.5°, that is, the included angle between the display surfaces of two LED display screens is −2.5°.

Figure 9:
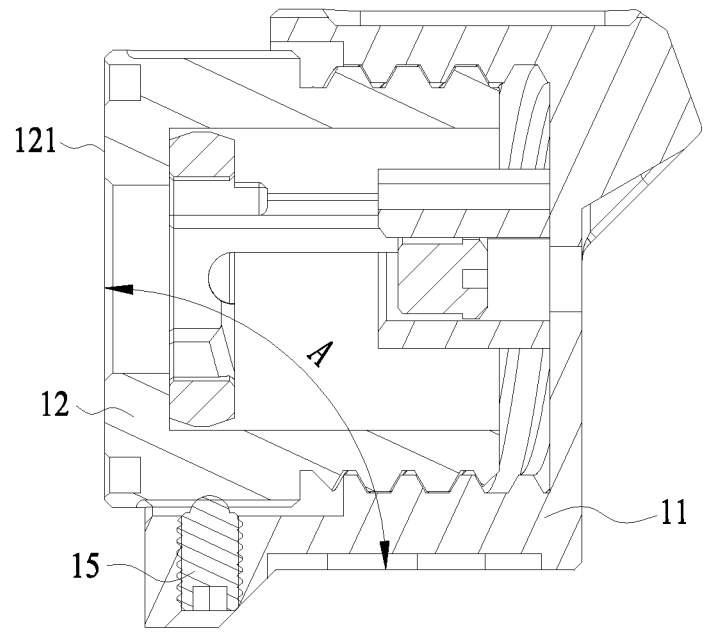
FIG. 9 is an adjustment state diagram III of the bevel of the first lock body provided by an embodiment of the present application.

If A in FIG. 9 is 90°, the included angle between the first mounting surface 114 and the second mounting surface 213 is −2.5°, that is, the included angle between the display surfaces of two LED display screens is 0°.

Figure 10:
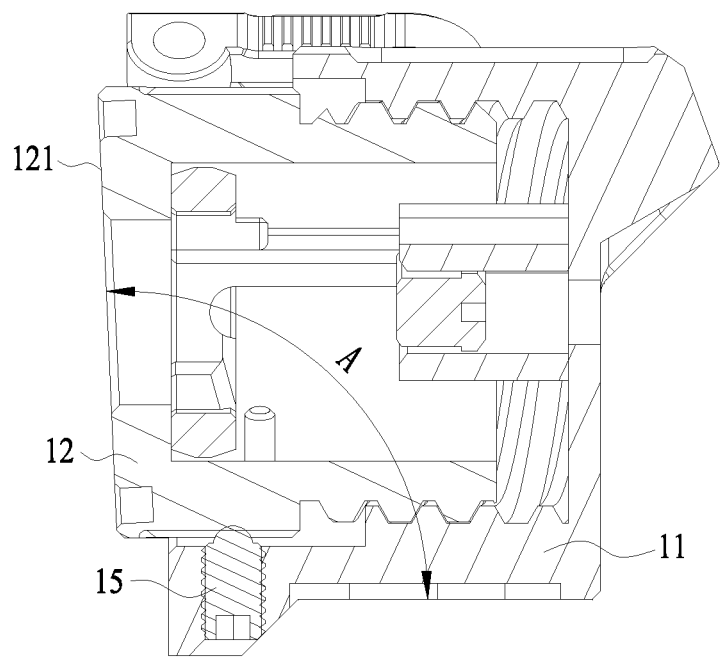
FIG. 10 is an adjustment state diagram IV of the bevel of the first lock body provided by an embodiment of the present application.

If A in FIG. 10 is 92.5°, the included angle between the first mounting surface 114 and the second mounting surface 213 is −2.5°, that is, the included angle between the display surfaces of two LED display screens is 2.5°.

Figure 11:
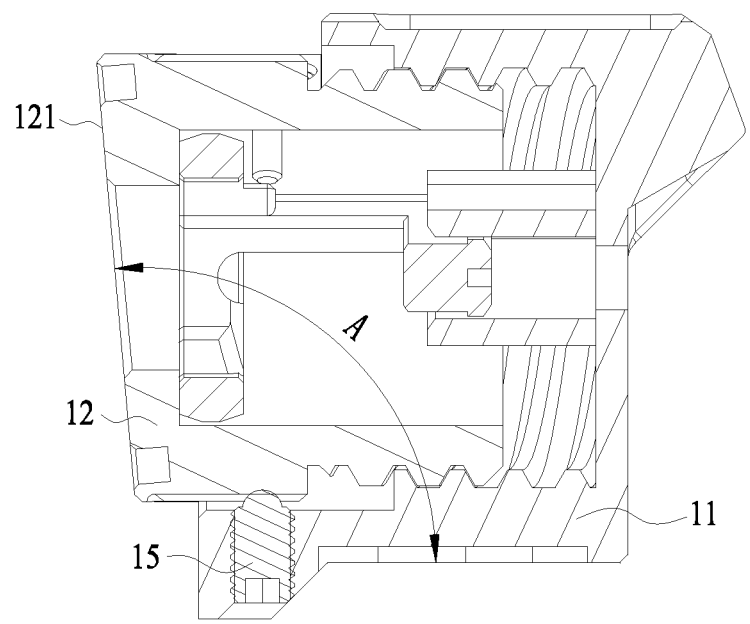
FIG. 11 is an adjustment state diagram V of the bevel of the first lock body provided by an embodiment of the present application.

If A in FIG. 11 is 95°, the included angle between the first mounting surface 114 and the second mounting surface 213 is −2.5°, that is, the included angle between the display surfaces of two LED display screens is 5°.

Preferably, as shown in FIG. 4, the bevel 121 is provided with an angle label 126, the angle label 126 is the angle between the first mounting surface 114 and the second mounting surface 213 when the bevel 121 and the limit surface 212 are attached.

In an embodiment, as shown in FIG. 3, the angle rotating disc 12 is provided with a rotating disc handle 124, which is convenient for rotating the angle rotating disc 12.

In an embodiment, as shown in FIG. 3, each bevel 121 is provided with a positioning hole 122, and a positioning post 211 protruding toward the angle rotating disc 12 is arranged on the limit surface 212, the positioning post 211 is used to insert into the positioning hole 122 to limit the rotation of the angle rotating disc 12. The positioning post 211 is inserted into the positioning hole 122, which is beneficial to the accurate location of the rotating angle rotating disc 12, thus preventing the angle rotating disc 12 from rotating when a bevel 121 is attached to the limit surface 212, and improving the attachment stability of the bevel 121 and the limit surface 212.

Preferably, the number of positioning posts 211 is two, the two positioning posts 211 are symmetrically arranged at 180° along the circumferential direction of the limit surface 212. One positioning post 211 is inserted into the positioning hole 122 of one bevel 121, another positioning post 211 is inserted into the positioning hole 122 of another bevel 121 coplanar with the bevel 121.

In an embodiment, the angle rotating disc 12 is movably arranged on the angle rotating disc base 11, and rotating the angle rotating disc 12 can drive the angle rotating disc 12 to move along the axial direction of the angle rotating disc 12 relative to the angle rotating disc base 11. When the angle rotating disc 12 rotates to different bevels 121, the axial position of the angle rotating disc 12 on the angle rotating disc base 11 is different, which is beneficial to adjusting the splicing distance between the display surfaces of two LED display screens with different arcs, avoiding excessive spacing between the display surfaces of two LED display screens, preventing the display effect from being affected and improving the splicing effect.

Preferably, as shown in FIG. 3, the angle rotating disc base 11 is provided with a thread groove 111, and one end of the angle rotating disc 12 connected with the angle rotating disc base 11 is provided with an external thread 125. The thread groove 111 and external thread 125 are matched to threadedly connect the angle rotating disc base 11 and angle rotating disc 12. With the matching of the thread groove 111 and the external thread 125, the angle rotating disc 12 can move along its own axis while moving around its own axis. The structure is simple, which is conducive to controlling the position of the angle rotating disc 12 in its axial direction and is convenient for processing and installation.

In an embodiment, the lock plate 13 is axially and fixedly connected with the angle rotating disc 12, so that the lock plate 13 moves along the axial direction of the angle rotating disc 12 with the angle rotating disc 12. Therefore, the axial distance between the lock plate 13 and the fixed base 21 remains unchanged, so that the lock rod 221 with fixed length can adapt to the above different locking angles. Therefore, it is unnecessary to adjust the depth of the lock rod 221 extending into the angle rotating disc 12 and the lock plate 13. The operation process is simple, and the installation is convenient.

In an embodiment, as shown in FIG. 3, the lock plate 13 includes a lock core 131 and a lock hole 133 disposed on the lock core 131, an axially penetrating stepped hole 127 is disposed on the angle rotating disc 12, and the lock core 131 is located in the stepped hole 127. The first lock body 1 further includes a limit screw 14, the limit screw 14 is fixed on the angle rotating disc 12, and one end of the limit screw 14 extends into the stepped hole 127, and the limit screw 14 is used for cooperating with the steps of the stepped hole 127 to limit the lock core 131 from moving in the axial direction relative to the angle rotating disc 12. Therefore, the lock plate 13 can move along with the angle rotating disc 12 in the axial direction. The structure is simple, and the internal space of the angle rotating disc 12 is fully utilized. Compared with the existing arc lock, the locking device of the present application has a more compact overall structure, the volume of the locking device is reduced, it can be installed in a smaller space, and is convenient for processing and installation.

In an embodiment, the lock plate 13 is radially and fixedly connected with the angle rotating disc base 11 to restrict the lock plate 13 from rotating with the angle rotating disc 12. When the angle rotating disc 12 rotates, the lock plate 13 remains fixed in the circumferential direction and does not rotate with the angle rotating disc 12, so that the locking position of the spring lock 22 and the lock plate 13 is fixed, which is convenient for mutual locking with the spring lock 22 and is beneficial to quick installation.

In an embodiment, as shown in FIG. 3, the lock plate 13 further includes a slide rail 132 fixed on the lock core 131, and a sliding groove 112 is arranged in the thread groove 111 of the angle rotating disc base 11. The slide rail 132 is movably arranged in the sliding groove 112, and the sliding groove 112 is used for limiting the lock plate 13 to rotate with the angle rotating disc 12. The locking device is simple in structure and the internal space of the angle rotating disc base 11 is fully utilized. Compared with the existing arc lock, the locking device has a more compact overall structure, the volume of the locking device is reduced, it can be installed in a smaller space, and is convenient for processing and installation.

Figure 5:
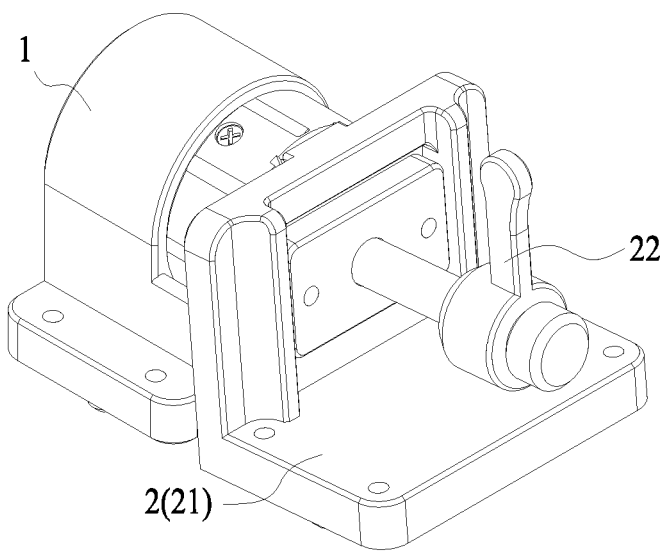
FIG. 5 is a schematic diagram of the unlocking state the locking device provided by an embodiment of the present application.
Figure 6:
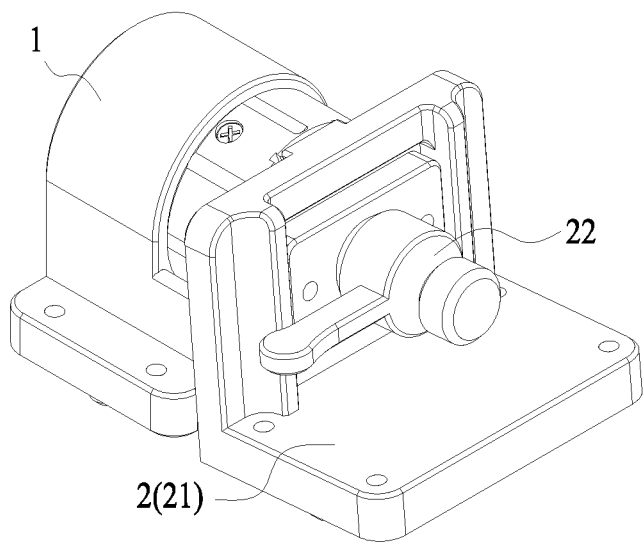
FIG. 6 is a schematic diagram of the locking state the locking device provided by an embodiment of the present application.

In an embodiment, as shown in FIGS. 3, 5 and 6, the spring lock 22 includes a lock rod 221, a pull rod 222, a baffle 223 and a lock rod handle 224, and the pull rod 222 is fixed at the tail end of the lock rod 221 and radially penetrates through the lock rod 221. The lock rod handle 224 is arranged at the head end of the lock rod 221, and the lock rod 221 penetrates through the baffle 223 and is movably connected with the baffle 223. The baffle 223 is arranged between the pull rod 222 and the handle to limit the lock rod 221 from pulling out the baffle 223, and the baffle 223 is fixed on the fixed base 21. The lock hole 133 includes a through hole 1331 and a bypass groove 1332 communicating with the through hole 1331. The through hole 1331 is used for the lock rod 221 to pass through. The tail end of the lock rod 221 extends into the lock hole 133, rotating the handle can make the pull rod 222 misaligned and catch the lock hole 133. To lock, rotate the lock rod handle 224 to make the pull rod 222 face the bypass groove 1332, then push the lock rod 221 into the lock hole 133 along the axial direction of the lock rod 221, and after the pull rod 222 passes through the bypass groove 1332, rotate the lock rod handle 224 again to make the pull rod 222 and bypass groove 1332 misaligned, so that the pull rod 222 catches the lock hole 133, and the handle abuts against the baffle 223, thus locking the spring lock 22 and the lock plate 13. To unlock, rotate the lock rod handle 224 to make pull rod 222 face the bypass groove 1332, and then pull the lock rod 221 out of the lock hole 133 along the axial direction of the lock rod 221, thus unlocking the spring lock 22 and the lock plate 13.

In an embodiment, as shown in FIG. 3, the angle rotating disc 12 is provided with a plurality of marble grooves 123, one marble groove 123 corresponds to one bevel 121, the angle rotating disc base 11 is fixed with a marble 15, and the marble 15 is clamped in the marble groove 123. When the angle rotating disc 12 is rotated to make the limit surface 212 fit with different bevels 121, the marble 15 is clamped with the marble groove 123 corresponding to the bevel 121, which facilitates the rotational location of the angle rotating disc 12, enables the different bevels 121 to be replaced more quickly and accurately, and improves the splicing efficiency of LED display screens. The structure is simple, which avoids increasing the volume of the locking device and is convenient for processing and installation.

The angle rotating disc base 11 is provided with a mounting hole 113, and the marble 15 is fixed in the mounting hole 113.

The singular terms "a", "an" and "the" include plural reference and vice versa unless the context clearly indicates otherwise. The above description is only specific embodiments of the disclosure, not intended to limit the present disclosure. Any modifications, equivalent substitutions and improvements made in accordance with the principles of the present disclosure shall be understood as falling within the protection scope of the present disclosure.

What is claimed is:
1. A locking device, comprising a first lock body and a second lock body;
the first lock body comprises an angle rotating disc base, an angle rotating disc and a lock plate, wherein the angle rotating disc is connected with the angle rotating disc base, the angle rotating disc can rotate around its own axis, the lock plate is arranged between the angle rotating disc base and the angle rotating disc; the angle rotating disc base is provided with a first mounting surface for mounting an LED display screen;
the second lock body comprises a fixed base and a spring lock, wherein the spring lock is arranged on the fixed base, the fixed base is provided with a limit surface facing one end face of the angle rotating disc and a second mounting surface for mounting another LED display screen;
the one end face of the angle rotating disc facing the limit surface is provided with a plurality of bevels at intervals along a circumferential direction, and included angles of the plurality of bevels and the first mounting surface are different;
rotating the angle rotating disc can make the limit surface fit with different bevels to adjust the included angle between the first mounting surface and the second mounting surface, and the spring lock and lock plate can be mutually locked to fix the first lock body and the second lock body temporarily; and
the angle rotating disc is movably arranged on the angle rotating disc base, and rotating the angle rotating disc can drive the angle rotating disc to move along the axial direction of the angle rotating disc relative to the angle rotating disc base.

2. The locking device of claim 1, wherein the fixed base is L-shaped, and the limit surface is perpendicular to the second mounting surface.

3. The locking device of claim 1, wherein the plurality of bevels are uniformly arranged along the circumferential direction of the one end face of the angle rotating disc.

4. The locking device of claim 3, wherein the included angle between each bevel and the first mounting surface gradually increases along circumferential direction of the one end face of the angle rotating disc.

5. The locking device of claim 3, wherein the number of the bevels is even, and every two bevels symmetrically arranged at 180° are coplanar.

6. The locking device of claim 3, wherein the bevel is provided with an angle label.

7. The locking device of claim 1, wherein a positioning hole is arranged on each bevel, and a positioning post protruding toward the angle rotating disc is arranged on the limit surface, and the positioning post is used for inserting into the positioning hole to limit the rotation of the angle rotating disc.

8. The locking device of claim 1, wherein the angle rotating disc base is provided with a thread groove, one end of the angle rotating disc connected with the angle rotating disc base is provided with an external thread, and the thread groove is matched with the external thread to threadedly connect the angle rotating disc base and the angle rotating disc.

9. The locking device of claim 8, wherein the lock plate is axially and fixedly connected with the angle rotating disc, so that the lock plate moves along the axial direction of the angle rotating disc with the angle rotating disc.

10. The locking device of claim 9, wherein the lock plate comprises a lock core and a lock hole arranged on the lock core, the angle rotating disc is provided with an axially penetrating stepped hole, and the lock core is positioned in the stepped hole; the first lock body further comprises a limit screw, and the limit screw is fixed on the angle rotating disc, one end of the limit screw extends into the stepped hole, and the limit screw is used for cooperating with steps of the stepped hole to limit the lock core to move axially relative to the angle rotating disc.

11. The locking device of claim 10, wherein the lock plate is radially and fixedly connected with the angle rotating disc base to restrict the lock plate from rotating with the angle rotating disc.

12. The locking device of claim 11, wherein the lock plate further comprises a slide rail fixed on the lock core, and a sliding groove is arranged in the thread groove of the angle rotating disc base, the slide rail is movably arranged in the sliding groove, and the sliding groove is used for restricting the lock plate from rotating with the angle rotating disc.

13. The locking device of claim 1, wherein the angle rotating disc is provided with a plurality of marble grooves, one marble groove corresponds to one bevel, a marble is fixed on the angle rotating disc base, and the marble is clamped in the marble groove.

14. The locking device of claim 1, wherein the angle rotating disc is provided with a rotating disc handle.

* * * * *